US006776086B1

(12) United States Patent
Chang Chien

(10) Patent No.: US 6,776,086 B1
(45) Date of Patent: Aug. 17, 2004

(54) SAFETY SWITCH FOR A FOOD PROCESSOR

(75) Inventor: Sung Shan Chang Chien, Kaohsiung Hsien (TW)

(73) Assignee: Ken Ying Enterprise Co., Ltd., Kaohsiung Hsien (TW)

( * ) Notice: Subject to any disclaimer, the term of this patent is extended or adjusted under 35 U.S.C. 154(b) by 81 days.

(21) Appl. No.: 10/422,736

(22) Filed: Apr. 25, 2003

(51) Int. Cl.[7] .......................... A23L 1/00; A23N 1/00; A23N 1/02; A47J 43/046; A47J 43/07

(52) U.S. Cl. .......................... 99/492; 99/348; 366/206; 366/601; 241/37.5; 241/92

(58) Field of Search .......................... 99/326–331, 342, 99/348, 337, 338, 492, 501–513; 241/36, 37.5, 92, 282.1, 282.2; 366/96–98, 100, 197, 205, 206, 314, 601; 200/302.1, 302.2, 302.3; 361/195–203; 219/492, 494, 442, 506, 486; 318/811, 722; 700/90

(56) References Cited

U.S. PATENT DOCUMENTS 3,548,280 A * 12/1970 Cockroft .................... 366/601
3,809,325 A * 5/1974 Marrie .................... 366/206 X
4,487,509 A * 12/1984 Boyce .................... 366/199
4,568,193 A * 2/1986 Contri et al. .............. 366/206
4,681,030 A * 7/1987 Herbert .................... 99/484
4,921,174 A * 5/1990 Okada et al. .............. 366/601 X
4,921,175 A * 5/1990 Okada et al. .............. 241/37.5
4,941,403 A * 7/1990 Cimenti .................... 99/510 X
5,031,518 A * 7/1991 Bordes .................... 366/314 X
5,184,893 A * 2/1993 Steele et al. .............. 366/209
5,316,382 A * 5/1994 Penaranda et al. ........ 99/348 X
5,347,205 A * 9/1994 Piland .................... 366/206 X
5,556,198 A * 9/1996 Dickson, Jr. et al. ....... 366/601

* cited by examiner

*Primary Examiner*—Timothy F. Simone
(74) *Attorney, Agent, or Firm*—Leong C. Lei

(57) ABSTRACT

A safety switch for a food processor which is characterized in that the bottom seat is connected to the cup body and a rim seat is positioned at the connection between the bottom seat and the cup body, the end face of the rim seat is provided with the through hole mounted with a push block, the end head of the push block is inserted with a safety switch, and the corresponding position of the bottom side of the cup body and push block is provided with a top rod, the push block is provided with a top block and closely adhered to the push block, the other side of the sliding seat is provided with a micro switch connected to the power source of the switch panel, the outer side of the micro switch is provided with a protruded pin, and the bottom seat is provided with a protruded side mounted with a push rod urged by the spring, and an outward protruded press plate is provided between the top cap and the pivot structure, and the external end of the press plate is adhered to the top end face of the push rod.

2 Claims, 8 Drawing Sheets

17
18
181
32
3
33
31
16
141
14
13
131
132
133
134
2
15
151
4

18
182
181
32
31
33
16
141
14
13
131
132
2
133
134
15
151
4

SAFETY SWITCH FOR A FOOD PROCESSOR

BACKGROUND OF THE INVENTION (a) Technical Field of the Invention

The present invention relates to a safety switch, and in particular, a safety switch that is operated with a touch to operate a food processor.

(b) Description of the Prior Art

Food processors or the like appliances are known, and they enable attachments of chopping blades, grating and shredding disks, liquidizers etc. to the bowl or cup body thereof. The attachments are rotated within the bowl or cup body by an electric-powered motor disposed in a bottom seat and has its shaft projecting into the bowl or cup body.

In certain household food processors, the motor is housed in a bottom seat, having the bowl or the cup body being mounted on the bottom seat but above the motor. The bottom of the cup body surrounds a base plate provided with lugs which are inserted into grooves when the bowl is mounted on the base, so that the cup body is held stationary in a determined position on the bottom seat.

The appliances should be provided with a safety means to prevent injuries to users as a result of accidentally triggering of the switch. Such means are designed to prevent any contact between the hands of the user and an attachment that is rotating. Therefore, the appliance must be capable of operating only when a top cap closes the cup body. The conventional safety means found in a number of food processors or similar appliances are obtained by a safety rod which enables the appliance to operate. That is the means enables the motor to be started, only when the cup body is properly attached to the bottom seat, and when the top cap coves the cup body. In this way, it is impossible for them to be any contact between the hands of the user and an attachment that is rotating.

In that known device, the push rod extends along a channel formed along a generator line of the cylindrical cup body. The spring is mounted in the bottom portion of the channel extending along a generator line of the cylindrical cup body. The spring automatically urges the push rod to the high position as soon as the cam is released, thereby closing the switch for starting the motor.

The switch for starting the motor is included in bottom seat. This means that the bottom portion of the push rod has to pass through the top surface of the bottom seat so as to come into contact with the switch. The bottom seat is provided with a hole for that purpose. To prevent splashes of liquid from ingression into the base, a flexible membrane commonly shuts off the hole. However, liquid or powder substances may be deposited on the membrane inside the hole, and they may work their way down inside the bottom seat and into the electrical circuit, with the safety means then becoming less effective. Accordingly, it is an object of the present invention to provide a safety switch for a food processor, which can overcome the above drawbacks.

SUMMARY OF THE INVENTION

Accordingly, it is an object of the present invention to provide a safety switch for a food processor comprising a bottom seat, a pivot structure, a cup body, a top cap, a motor, a blade and a switch panel characterized in that the bottom seat is connected to the cup body and a rim seat is positioned at the connection between the bottom seat and the cup body, the end face of the rim seat is provided with the through hole mounted with a push block, the end head of the push block is inserted with a safety switch, and the corresponding position of the bottom side of the cup body and push block is provided with a top rod, the switch located on a frame is provided with a sliding seat mounted with a spring such that the sliding seat is moveable to the left and right on the frame, the corresponding end of the sliding seat and the push block is provided with a top block and closely adhered to the push block, the other side of the sliding seat is provided with a micro switch connected to the power source of the switch panel, the outer side of the micro switch is provided with a protruded pin, and the bottom seat is provided with a protruded side mounted with a push rod urged by the spring, the lower end of the push rod is a notch of smaller radius which passes through a positioning seat at the frame, corresponding the contact pin without touching the contact pin, and an outward protruded press plate is provided between the top cap and the pivot structure, and the external end of the press plate is adhered to the top end face of the push rod.

Yet another further object of the present invention is to provide a safety switch for a food processor comprising, comprising a bottom seat a pivot structure, a cup body, a top cap, a motor, a blade and a switch panel characterized in that the bottom seat is connected to the cup body and a rim seat is positioned at the connection between the bottom seat and the cup body, the end face of the rim seat is provided with the through hole mounted with a push block, the end head of the push block is inserted with a safety switch, and the corresponding position of the bottom side of the cup body and push block is provided with a top rod, the bottom seat is provided with a protruded side having mounted with a push rod urged by a spring, and the lower end of the push rod has a smaller radius notch, and the safety switch located on a frame is provided with a sliding seat mounted with a spring such that the sliding seat is moveable to the left and right on the frame, the corresponding end of the sliding seat and the push block is provided with a top block and closely adhered to the push block, the other side of the sliding seat is provided with a urging plate with a notch larger than the push rod, the lower end of the push rod has a notch passed through and the external end of the push rod and a corresponding position of the urging plate is an engaging slot and the bottom seat and the corresponding position of the lower end of the push rod is a micro switch having a protruded contact pin, the micro switch is connected to the power source of the switch panel, the contact pins corresponding to each other but without touching the contact pin, and an outward protruded press plate is provided between the top cap and the pivot structure, and the external end of the press plate is adhered to the top end face of the push rod.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
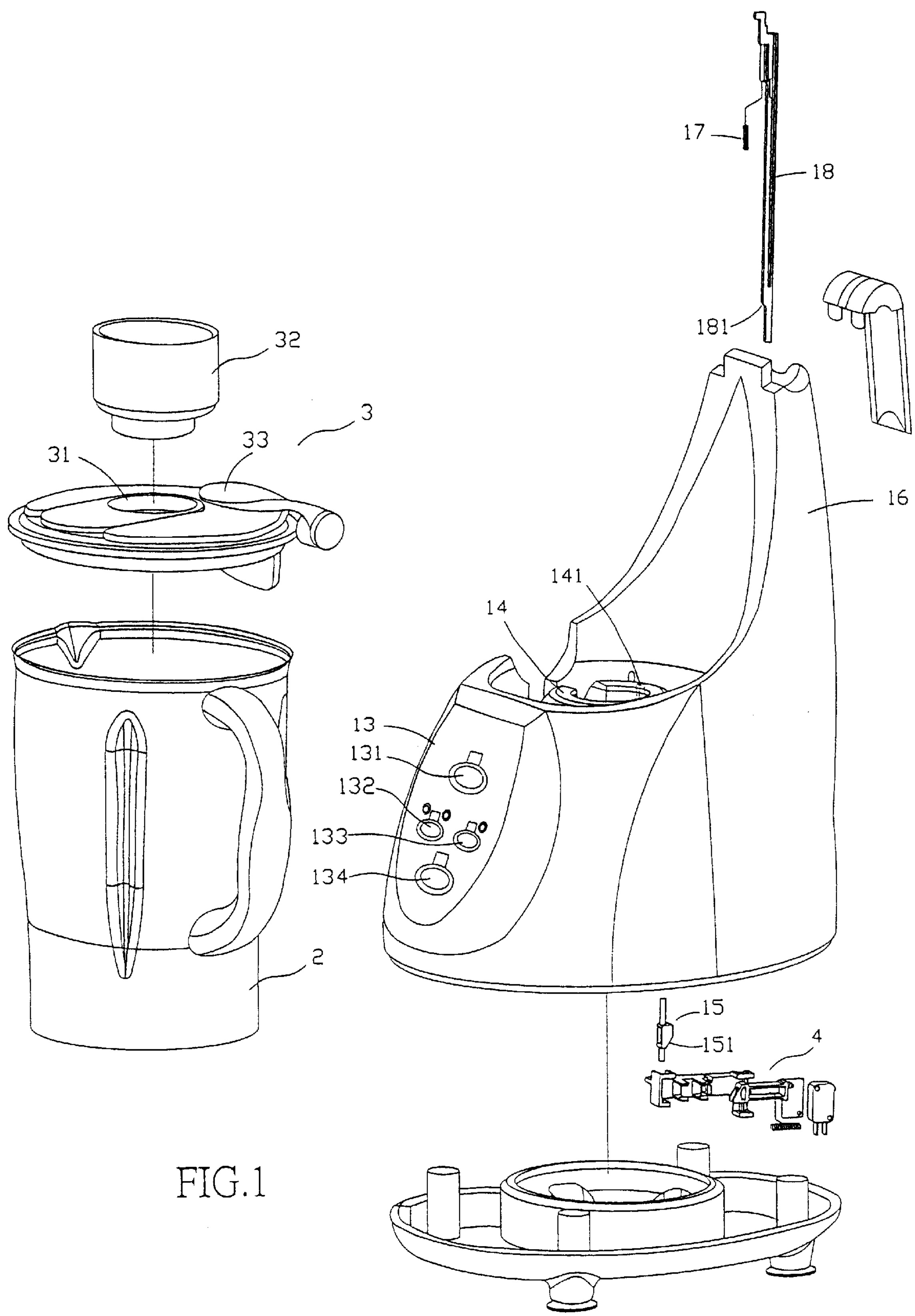
FIG. 1 is a perspective exploded view of a preferred embodiment of the present invention.
Figure 2:
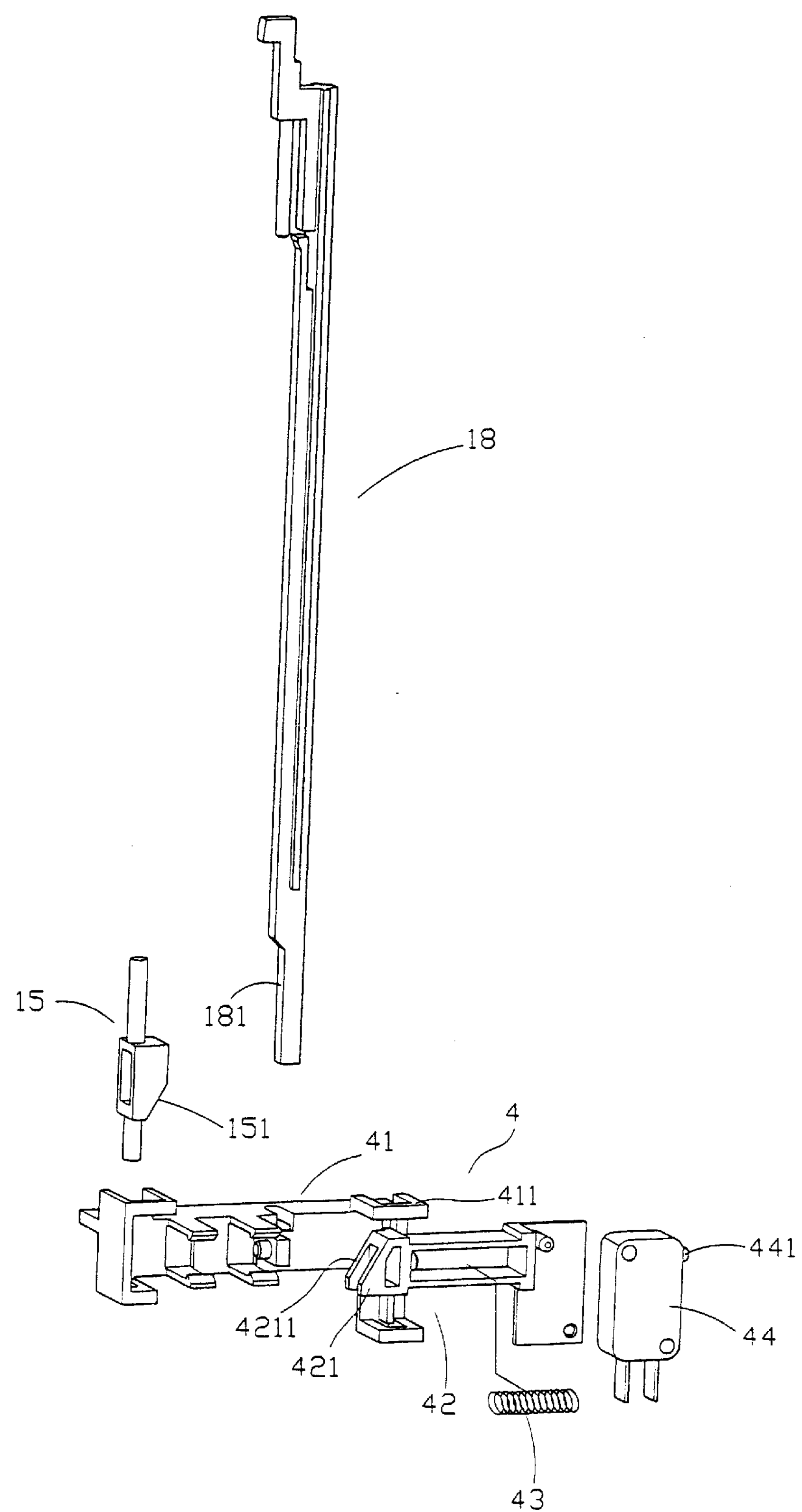
FIG. 2 is an exploded perspective view of a safety switch of FIG. 1 of the present invention.
Figure 3:
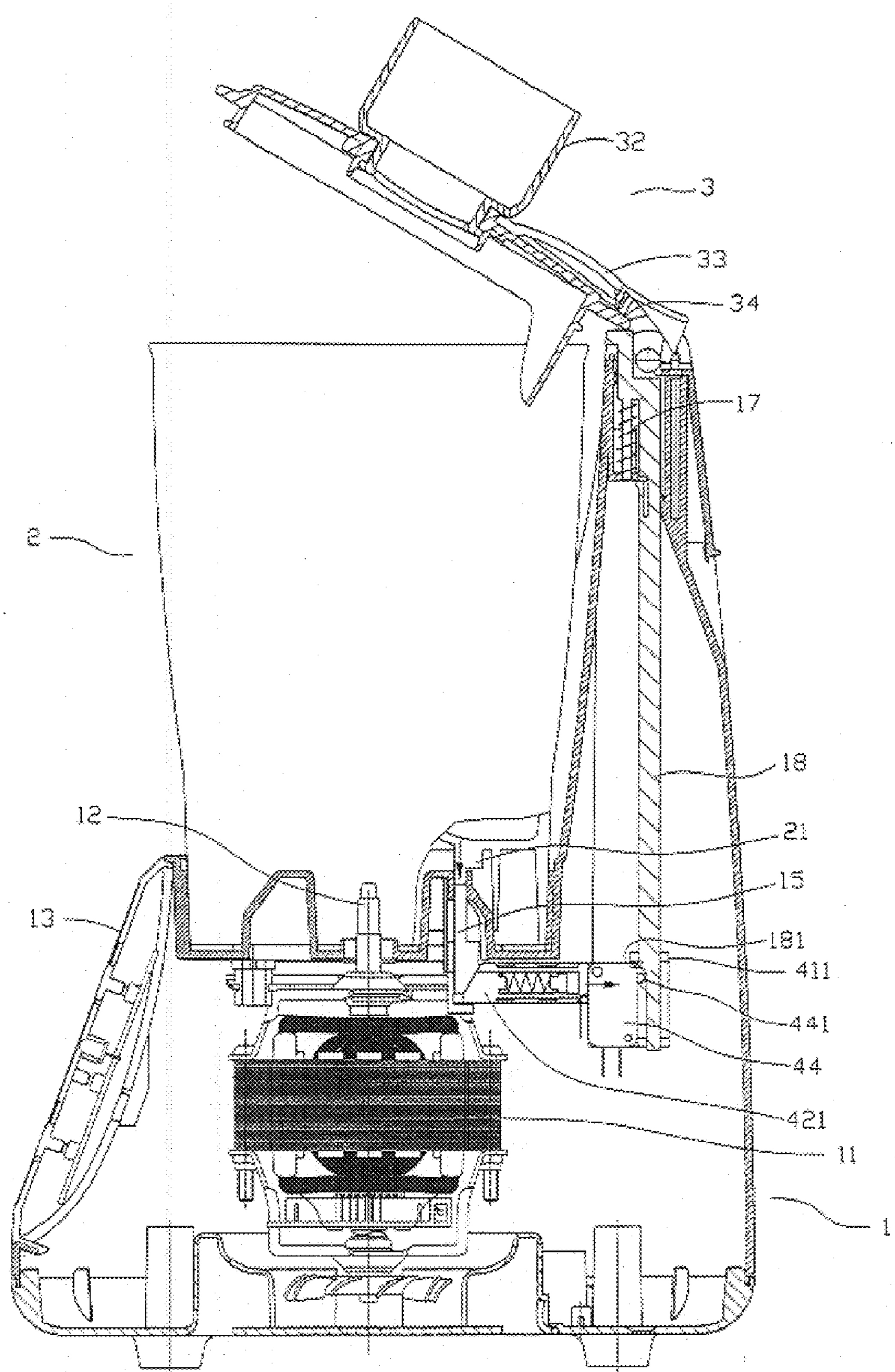
FIG. 3 is a sectional view of FIG. 1 of the present invention.

Referring to FIGS. 1, 2 and 3, there is shown a food processor having a structure, which is known to the public. The food processor comprises a bottom seat 1, a cup body 2 and a top cap 3, a motor 11 mounted within the bottom seat 1. The front end face of the bottom seat 1 is provided with a switch panel 13 mounted with intermittent button 131, auto-operation button 132, fast/slow speed button 133 and a stop button 134. In accordance with the present invention, the bottom seat 1 is connected to the cup body 2 and a rim seat 14 is positioned at the connection between the bottom seat 1 and the cup body 2, the end face of the rim seat 14 is provided with the through hole 141 mounted with a push block 15, the end head of the push block 15 is inserted with a safety switch 4, and the corresponding position of the bottom side of the cup body 2 and push block 15 is provided with a top rod 21, the switch 4 located on a frame 41 is provided with a sliding seat 42 mounted with a spring 43 such that the sliding seat 42 is moveable to the left and right on the frame 41, the corresponding end of the sliding seat 42 and the push block 15 is provided with a top block 422 and closely adhered to the push block 15, the other side of the sliding seat 42 is provided with a micro switch 44 connected to the power source of the switch panel 13, the outer side of the micro switch 44 is provided with a protruded pin 441, and the bottom seat 1 is provided with a protruded side mounted with a push rod 18 urged by the spring 17, the lower end of the push rod 18 is a notch 181 of smaller radius which passes through a positioning seat 411 at the fame, corresponding the contact pin 441 without touching the contact pin 441, and an outward protruded press plate 34 is provided between the top cap and the pivot structure 33, and the external end of the press plate 34 is adhered to the top end face of the push rod 18.

Referring to FIG. 3, after the cup body 2 is secured to the bottom seat 1, the top rod 21 of the bottom side of the cup body 2 passes through the through hole 141 of the rim seat 14. The push rod 21 squeezes the push block 15 downward. That is, the push block 15 pushes the sloping face 4211 of the top block 421 of the sliding seat 42 with the sloping face 151 of the push block 15. The spring 43 is compressed to cause the sliding seat 42 to move outward. Next, after the top cap 3 covers the cup body 2, the press plate 34 pushes the upper side end of the push rod 18 so that the compress spring 17 is compressed, and the push rod 18 moves downward following the lowering of the smaller radius notch 181. The larger radius end of the notch 181 will urge the contact pin 441 of the micro switch 44 and the micro switch 44 is in operation by the push rod 18. The power source of the switch panel 13 is ON and when the button is pressed, the food processor is activated. In accordance with the present invention, only when the cup body 2 has been mounted to the bottom seat 1 and the top cover 3 covers the cup body 2, the food processor can be activated.

Figure 4:
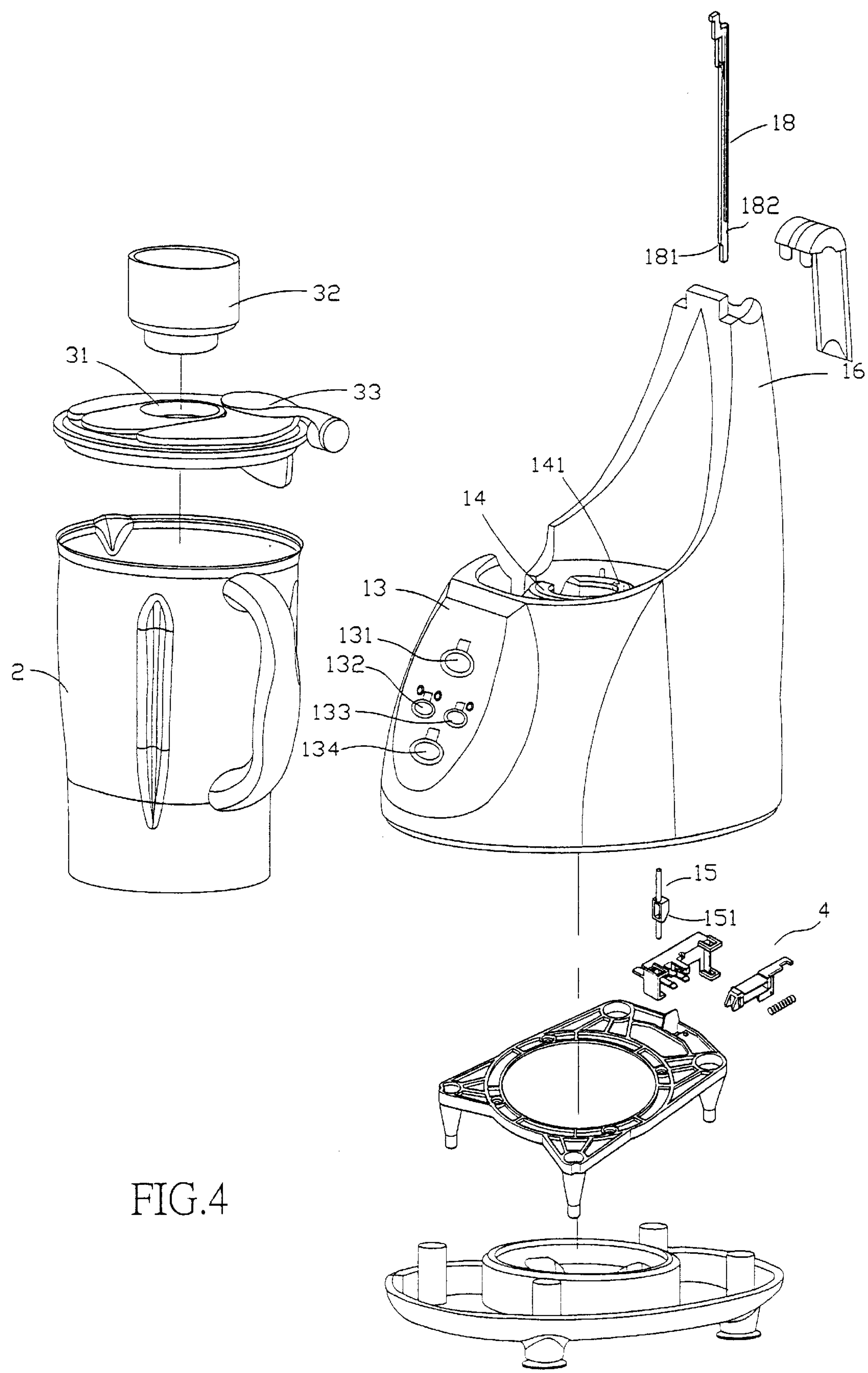
FIG. 4 is a sectional view of another preferred embodiment of the present invention.
Figure 5:
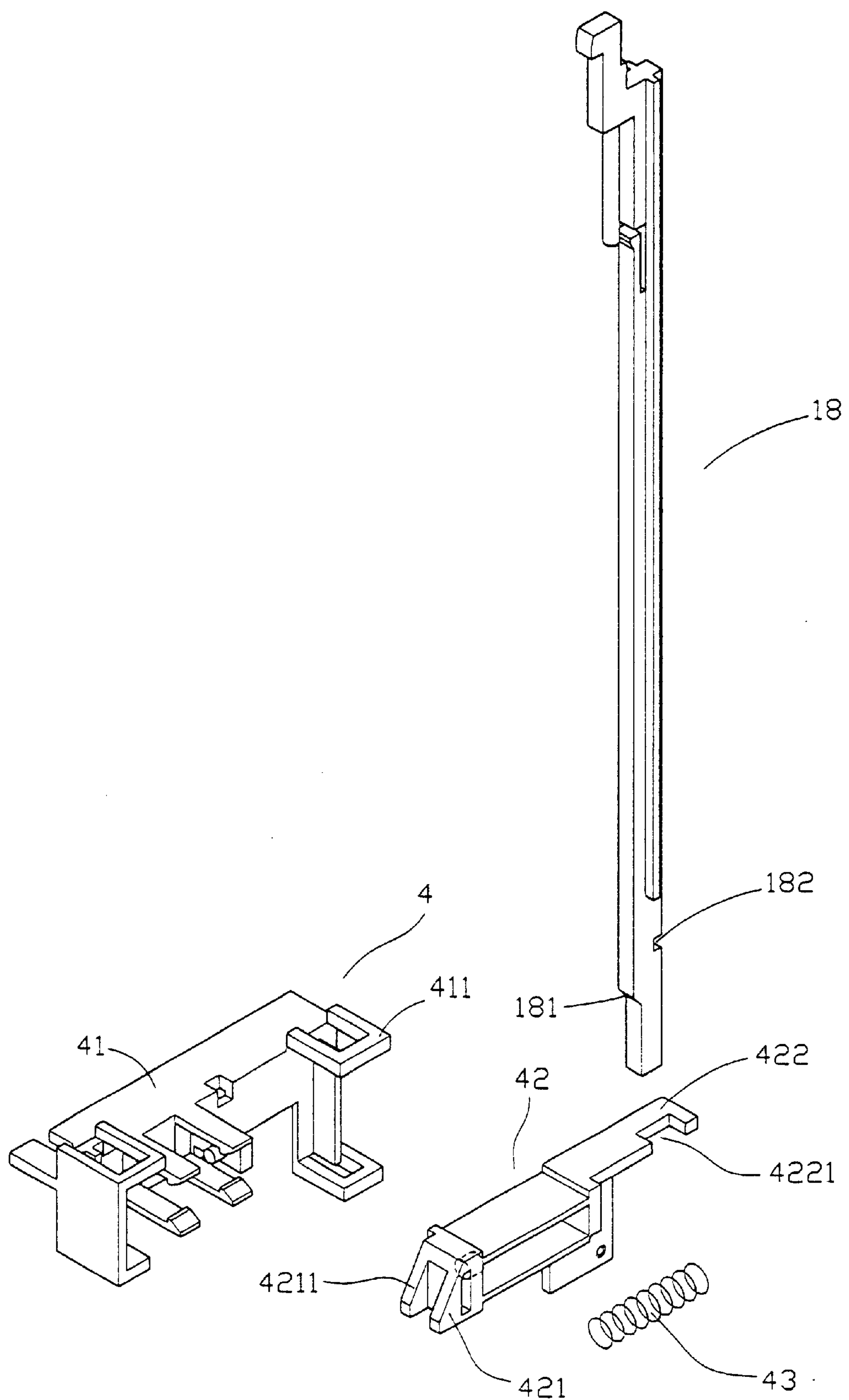
FIG. 5 is an exploded perspective view of a safety switch of FIG. 4 of the present invention.
Figure 6:
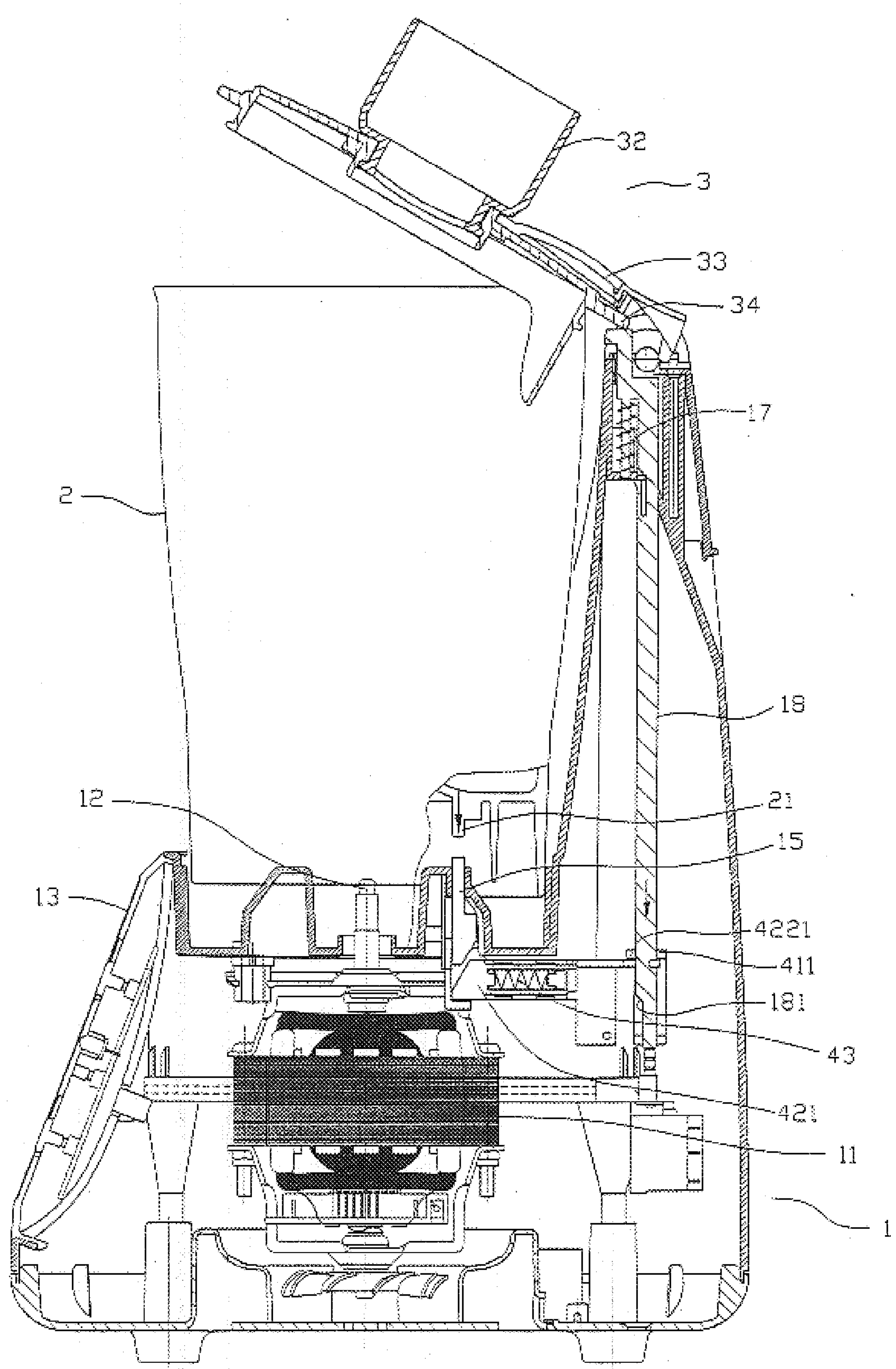
FIG. 6 is a sectional view of FIG. 4 wherein the top cap of the present invention has not been closed.
Figure 7:
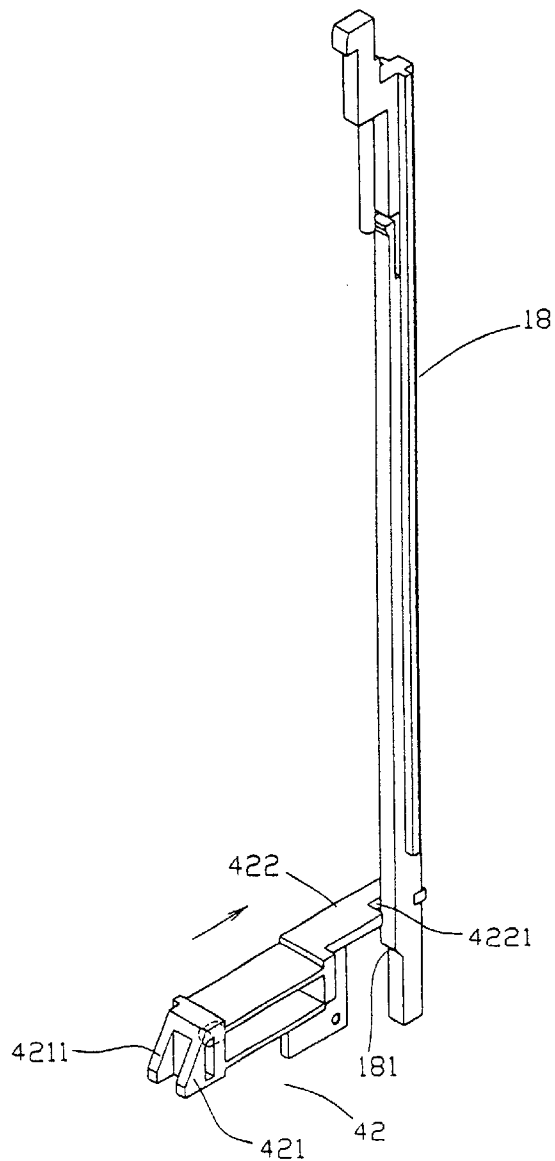
FIG. 7 is a schematic view showing the push rod and the switch-sliding seat of FIG. 4 having not being triggered.
Figure 8:
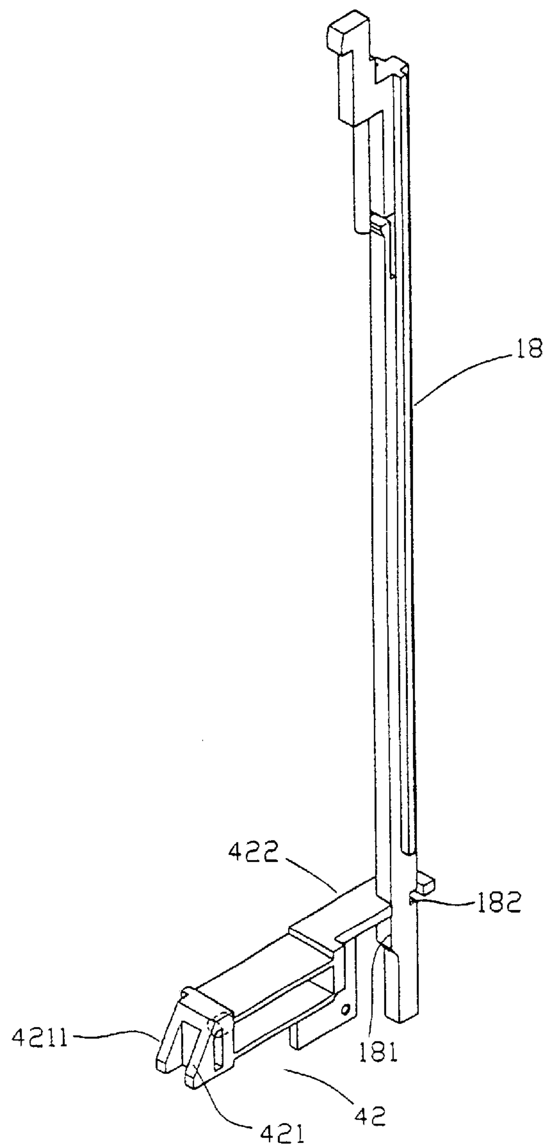
FIG. 8 is a schematic view showing the push rod and the switch-sliding seat of FIG. 4 being triggered.
Figure 9:
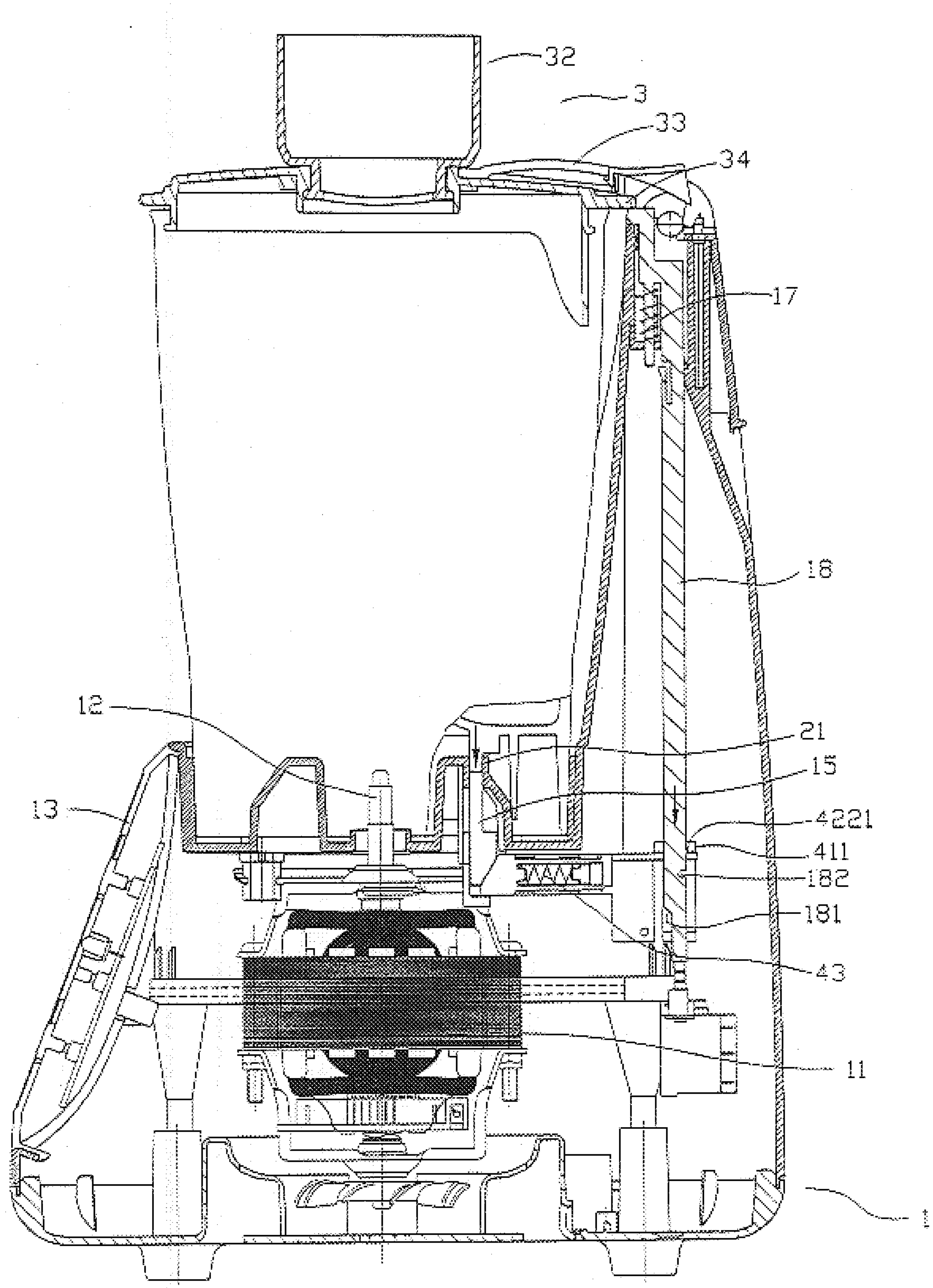
FIG. 9 is a sectional view showing the top cap of FIG. 4 being capped in accordance with the present invention.

Referring to FIGS. 4, 5 and 6, there is shown another preferred embodiment of the present invention. There is no micro switch at the external end of the sliding seat 42 but an urging plate 422 is used. The external end of the urging plate 422 is provided with a notch 4221 having a radius larger than the push rod 18. The lower end of the push rod 18 is passed through by a notch 4221, and the external end of the push rod 18 and the corresponding position of the urging plate 422 is an engaging slot 182. Referring to FIG. 7, when the cup body 2 has not been mounted onto the bottom seat 1, due to the extension force of the spring 43, the engaging slot 182 is engaged by the urging plate 422 so that the push rod 18 is restricted and is prevented from lowering. The bottom seat 1 and the end head of the push rod 18 is provided with a micro switch 45 provided with a protruded pin 451. The micro switch 45 and the power source of the switch panel 13 are connected when the push rod 18 has not been pressed, the lower end head of the push rod 18 does not contact with the contact pin 451. When the cup body 2 is secured to the bottom seat 1, as shown in FIGS. 8 and 9, the push block 15 touches the sliding block 421 of the sliding seat 42 by the sloping face 151 of the push block 15 such that the spring 43 is compressed and the sliding seat moves outward and the urging plate 422 is disengaged by the engaging slot of the push rod 18. That is, the sliding seat 42 does not restrict the push rod 18. When the top cap 3 covers the cup body 2, the push rod 18 moves downward by the press plate 33 of the top cap 3, the push rod 18 moves downward, and when the push rod 18 moves downward, the bottom end head of the push rod 18 touches the contact pin 451 of the micro switch 45, and the power source of the switch panel 13 is ON. Thus, the food processor only activates when the button on the switch panel 13 is pressed. In other words, only when the cup body 2 is secured to the bottom seat 1, and the top cap 3 is mounted onto the cup body 2. The motor 11 can be activated to drive the blade of the food processor.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A safety switch for food processor comprising a bottom seat, a pivot structure, a cup body, a top cap, a motor, a blade and a switch panel characterized in that: the bottom seat is connected to the cup body and a rim seat is positioned at the connection between the bottom seat and the cup body, an end face of the rim seat is provided with a through hole mounted with a push block, an end head of the push block is inserted with a safety switch, and the corresponding position of the bottom side of the cup body and push block is provided with a top rod, a switch located on a frame is provided with a sliding seat mounted with a spring such that the sliding seat is moveable to the left and right on the frame, the corresponding end of the sliding seat and the push block is provided with a top block and closely adhered to the push block, an other side of the sliding seat is provided with a micro switch connected to the a power source of the switch panel, an outer side of the micro switch is provided with a protruded pin, and the bottom seat is provided with a protruded side mounted with a push rod urged by the spring, a lower end of the push rod is a notch of smaller radius which passes through a positioning seat at the frame, corresponding the contact pin without touching the contact pin, and an outward protruded press plate is provided between the top cap and the pivot structure, and the external end of the press plate is adhered to a top end face of the push rod.

2. A safety switch for food processor comprising a bottom seat, a pivot structure, a cup body, a top cap, a motor, a blade and a switch panel characterized in that the bottom seat is connected to the cup body and a rim seat is positioned at the connection between the bottom seat and the cup body, an end face of the rim seat is provided with a through hole mounted with a push block, an end head of the push block is inserted with a safety switch, and the corresponding position of the bottom side of the cup body and push block is provided with a top rod, the bottom seat is provided with a protruded side having mounted with a push rod urged by a spring, and a lower end of the push rod has a smaller radius notch, and a safety switch located on a frame is provided with a sliding seat mounted with a spring such that the sliding seat is moveable to the left and right on the frame, the corresponding end of the sliding seat and the push block is provided with a top block and closely adhered to the push block, an other side of the sliding seat is provided with a urging plate with a notch larger than the push rod, the lower end of the push rod has a notch passed through and an external end of the push rod and a corresponding position of the urging plate is an engaging slot and the bottom seat and the corresponding position of a lower end of the push rod is a micro switch having a protruded contact pin, the micro switch is connected to a power source of the switch panel, the contact pin corresponding to each other but without touching the contact pin, and an outward protruded press plate is provided between the top cap and the pivot structure, and the external end of the press plate is adhered to the top end face of the push rod.

* * * * *